Feb. 9, 1937.   G. G. GILPIN   2,070,044
REFRIGERATING SYSTEM
Filed Aug. 19, 1935   7 Sheets-Sheet 1

Fig./

Inventor:
Garth G. Gilpin
Attorney

Feb. 9, 1937.  G. G. GILPIN  2,070,044
REFRIGERATING SYSTEM
Filed Aug. 19, 1935  7 Sheets-Sheet 5

Inventor:
Garth G. Gilpin
Attorney

Patented Feb. 9, 1937

2,070,044

UNITED STATES PATENT OFFICE 2,070,044

REFRIGERATING SYSTEM

Garth G. Gilpin, Riverside, Ill.

Application August 19, 1935, Serial No. 36,798

6 Claims. (Cl. 62—91.5)

The invention relates to means for refrigerating a cabinet used for cooling perishable commodities, such as meats, fruits, vegetables, candies, flowers, etc., and has for its object the use of solid carbon dioxide or other gas emanating refrigerant to set up a convection circulation of gas within a refrigerant container which, through the medium of a heat conducting wall, sets up a convection circulation of air through the lading compartment of the cabinet; that is, the compartment which holds the perishable commodities, etc.

A further object of the invention is to provide means for cooling commodities without allowing the emanating gas to come in contact with such commodities.

A further object is to provide means to circulate and recirculate the emanating gas in the refrigerant container so as to obtain the maximum amount of refrigeration from the refrigerant. Some systems now in use allow the emanating gas from solid carbon dioxide to escape into the atmosphere before its full heat absorbing capacity has been accomplished.

Another object of the invention is to provide means to control the amount of air coming in contact with the heat conducting wall of the refrigerant container and thereby control the amount of gas emanated from the solid refrigerant; in other words, control the amount of sublimation of the solid carbon dioxide or other refrigerant.

I have used the term "cabinet" to mean anything box-like used to cool commodities, such as display cabinets, household refrigerators, warehouses, storage houses, railway refrigerator cars, passenger train cars, automotive truck bodies, hulls of ships, etc.

A further object is to install such a refrigerating system in a cabinet or railway refrigerator car so that when desired a heating medium may be installed therein so as to set up convection circulation of air between the so-called refrigerant container and the lading compartment, as frequently such cars are used to ship perishables during the winter which require heating.

A further object is to install such a refrigerating system in a railway car so that the lading compartment may be ventilated (to carry off the gases of respiration of certain fruits and vegetables) through the usual roof hatch, wherein the hatch lid is obliquely disposed to direct the outside air through the refrigeration flues to the space between the solid floor and foraminous floor of the car and thence through or between the lading.

Figure 1:
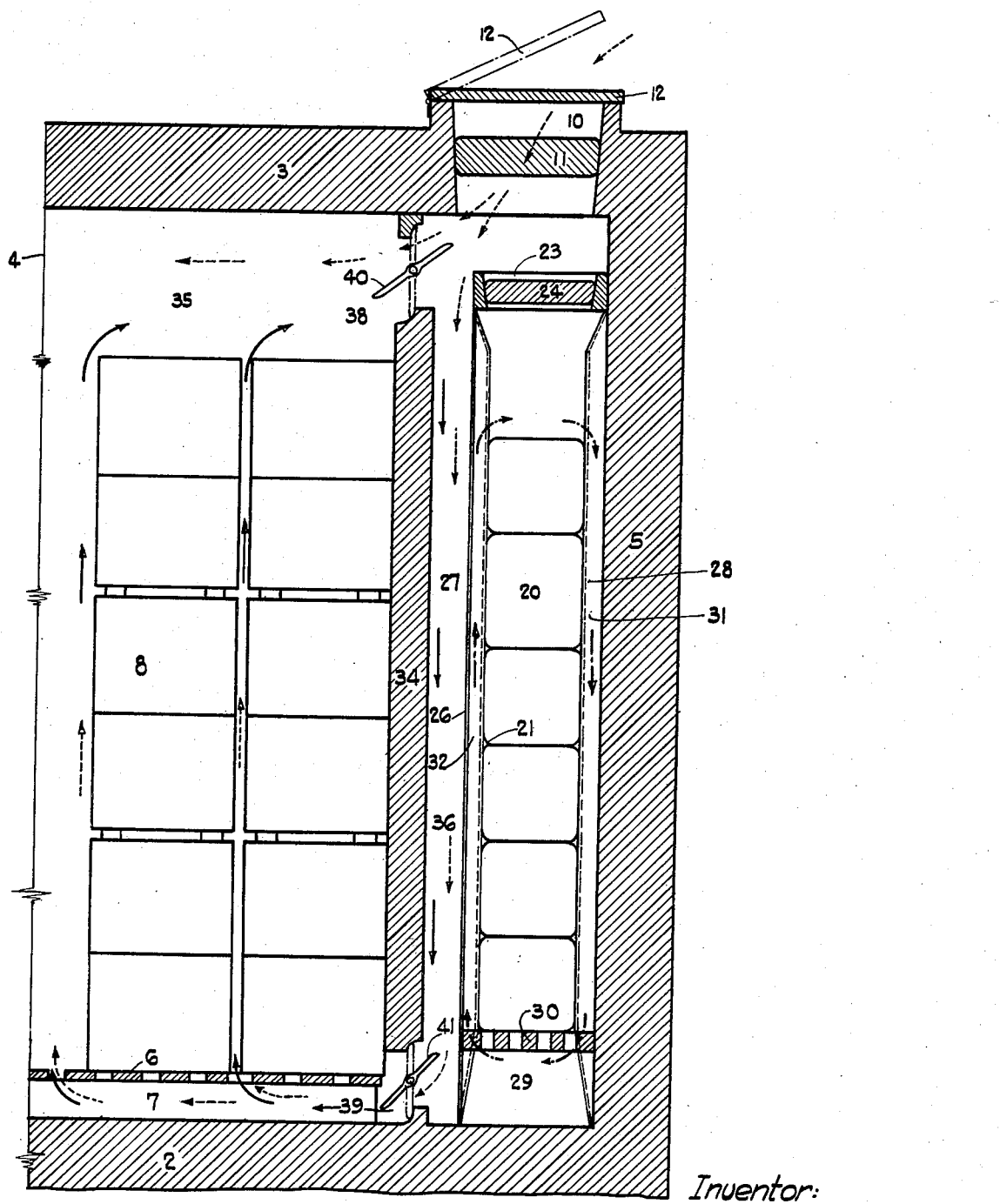
Fig. 1 shows a typical application of my invention in a railway refrigerating car.

The drawings illustrate adaptations of my improved refrigerating system for insulated railway cars which are called "refrigerator cars" and used to transport fruits, vegetables, meats and other perishable commodities. Such cars have insulated floors 2, roofs 3, side walls 4 and end walls 5. These cars are generally provided with a foraminous floor 6 spaced a little above the floor 2 of the car to support the lading so that cooled air, warmed air or ventilating air can pass through the space 7 below the lading and up between the packages 8 containing the lading. A hatch 10 is generally provided in the roof 3 of the car which is sealed by a removable plug 11 and provided with a hinged lid 12, lock and other associated parts.

Fig. 1 shows a form of my invention wherein the refrigerant container 20 for dry ice or other solid gas emanating refrigerant (21) is positioned adjacent one end wall 5 of the car, preferably below the hatch 10, in the roof 3 of the car. The top wall 23 of the container 20 is preferably insulated and provided with a hatch and plug 24 in close proximity to the hatch 10 in the roof of the car so that the refrigerant 21 may be loaded into the container 20 through these two hatches. One of the vertical walls of the refrigerant container is insulated (this may be the end wall 5 of the car as shown in Fig. 1) and the vertical wall opposite said insulated wall comprises a solid heat conducting wall 26 of material with a high coefficient of conductivity preferably, such as copper or aluminum. This heat conducting wall 26 may be corrugated or finned to increase its radiating surface. Means are provided to support the refrigerant in spaced relation to the insulated vertical wall and the heat conducting vertical wall as well as the bottom or floor of the container to form vertical (27—28)

and horizontal (29) gas flues. Such means may comprise a grating or a foraminous floor 30. In the drawings the insulated wall is provided with (wooden) vertical strips 31 and the metallic heat conducting wall is corrugated (32) to space the refrigerant from these walls.

An insulated bulkhead 34 separating the refrigerating chamber from the cooling compartment (or lading compartment 35) is positioned in spaced relation to the heat conducting wall 26 to provide a vertical air flue 36. The upper 38 and lower 39 ducts in the bulkhead connect the flue 36 with the lading compartment 35. Means 40—41 are provided to regulate the area of the upper 38 and lower 39 ducts, respectively, which means are preferably regulated by thermostats in the cooling or lading compartment 35. These means 40—41 are preferably simultaneously regulated so that the areas of the openings of the ducts 38—39 will be equal to each other at all times because if the upper duct was partially closed and the lower one open the cold air would fall and seep under the floor and cool the lower part of the load. Furthermore, if the lower duct is partially open and the upper duct wide open the hot air near the ceiling would enter the refrigerating chamber, and being cooled, back up into the lading compartment 35. The means to regulate the opening of the ducts may be manually operated and catches are provided to hold the means open for operating the car under ventilation.

In my arrangement the air within the flue 36 being cooled by contact with the heat conducting wall 26 sets up a convection circulation of air between the lading compartment 35 and the flue 36 through the upper 38 and lower 39 ducts. As shown by the arrows, the air being cooled by contact with the heat conducting walls 26 in the refrigerating chamber falls by gravity, passes through the lower duct 39 to the space 7 below the foraminous floor 6, up through such floor and the spaces between the lading 8, where it is warmed by contact with the lading, and rising to the ceiling of the car moves through the upper duct 38 into the flue 36 and repeats the cycle.

Simultaneously the emanating gas in the refrigerant container 20, being warmed by contact with the heat conducting wall 26, sets up a convection circulation of gas around the refrigerant 21; in other words, the emanated gas in the flue 32 between the refrigerant 21 and the heat conducting wall 26, being warmed by contact with the heat conducting wall 26, rises and conversely, the emanated gas in the flue 28 adjacent the insulated wall, being heavier than air, falls to the lower portion of the chamber, thus setting up a convection circulation of gas around the refrigerant. The circulation of gas and the circulation of air is simultaneous and each is caused by the other so that there is direct cooperation between the circulating gas and the circulating air.

The flue 36 is in direct communication with the hatch 10 in the roof so that when the lid 12 of the hatch is positioned obliquely, as shown in Fig. 1, the movement of the car forces the air through the hatch 10 in the roof and through the flue 36, and thence through both the upper 38 and lower 39 ducts in the bulkhead 34. The air passes out the hatch or hatches in the other end of the car carrying the gases of respiration and bringing in fresh air. The refrigerant container is sealed by the plug 24 against entrance of ventilating air and also so that the emanating gas will not escape and come in contact with the contents of the lading compartment. A small escape for this gas may be provided to allow for the expansion of the dry ice when sublimed. In the drawings the solid arrows and dot and dash arrows show the direction of movement of the air and gas, respectively, and the dotted arrows show the direction of movement of the ventilating air.

Figure 2:
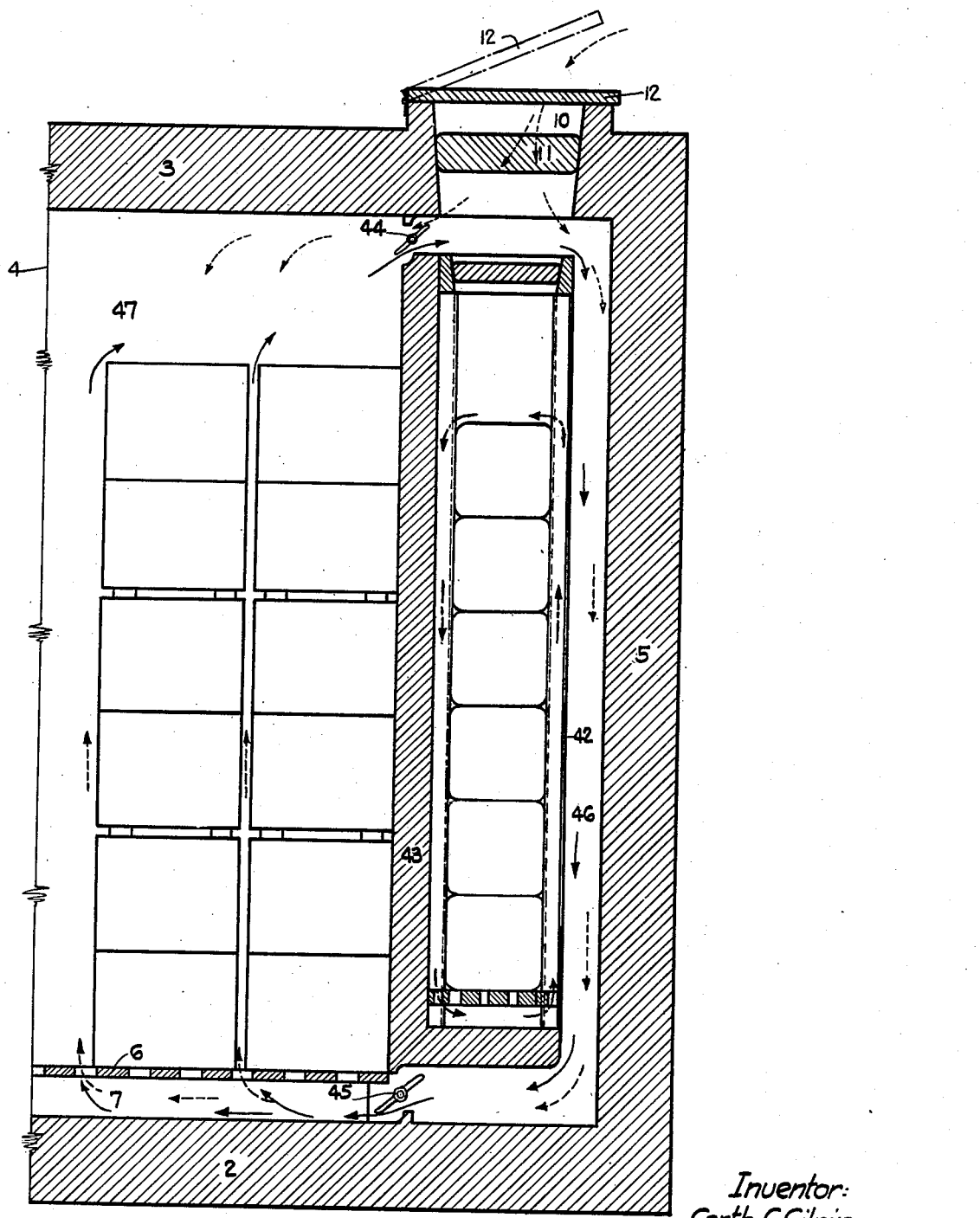
Fig. 2 is a modification of Fig. 1.

Fig. 2 is a modification of Fig. 1 and shows the heat conducting wall 42 adjacent the end wall of the car and shows the bulkhead 43 forming one vertical wall of the refrigerant container. The ducts 44—45 connect the flue 46 with the lading compartment 47.

Figure 3:
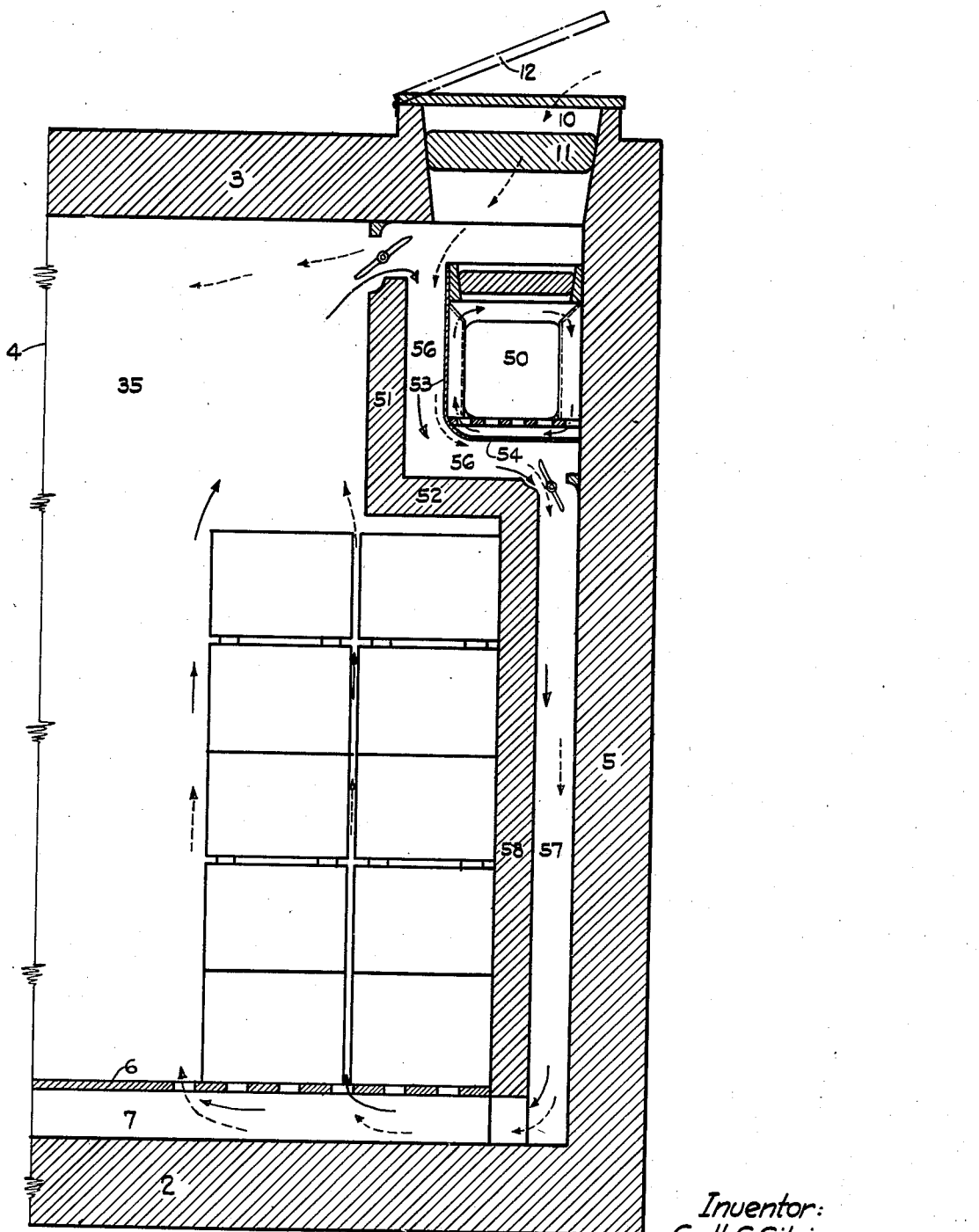
Fig. 3 shows my refrigerating unit positioned adjacent the upper part of one of the end walls of a refrigerating car.

Fig. 3 shows a modification wherein the refrigerant container 50 is positioned adjacent the upper part of one of the end walls 5 of the car and the bulkhead comprises vertical 51 and horizontal 52 portions spaced apart from one of the vertical walls 53 and the bottom 54 of the refrigerant container 50 forming a flue 56. A channel 57 is provided adjacent the end wall 5 with its upper end in communication with the flue 56 and with its lower end in communication with the space 7 below the foraminous floor 6. The wall 58 forming the channel 57 is preferably insulated. The convection circulation of gas within the refrigerant chamber is substantially the same as heretofore described. The air passes through the vertical and horizontal portions of the flue 56 and thence to the channel 57 to the space 7 below the foraminous floor. The ventilating air passes through the hatch 10 in the roof, thence through the vertical and horizontal portions of the flue 56 and thence through the channel 57.

In the modification shown in Figs. 3, 4, 5 and 7 the lading compartment extends below the refrigerant container, thereby increasing the cubical capacity of the car.

Figure 4:
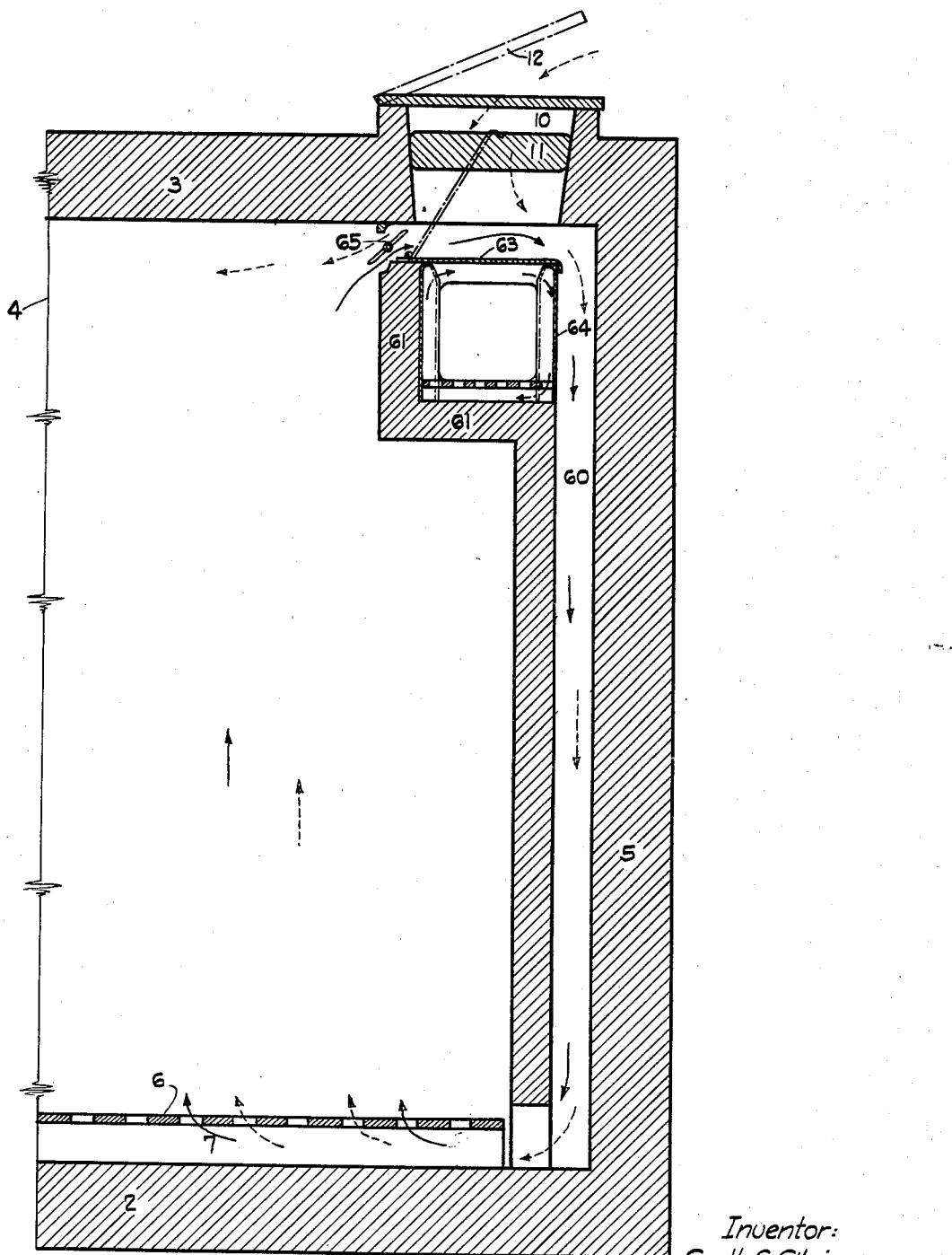
Fig. 4 is a modification of Fig. 3.

Fig. 4 is similar to the construction shown in Fig. 3 except that the flue 60 is positioned adjacent the end wall 5 of the car and the bulkhead 61 forms the rear and bottom portions of the refrigerant container. In this construction, however, the upper wall 63 is not insulated but is formed of heat conducting material and forms a heat conducting wall. The vertical wall 64 of the refrigerating chamber is also made of heat conducting material. The convection circulating air passes through the duct 65 over the top of the refrigerant container, down the vertical flue 60, thence the movement is similar to that heretofore described. The ventilating air passes almost directly from the hatch 10 in the roof of the vertical flue 60.

Figure 5:
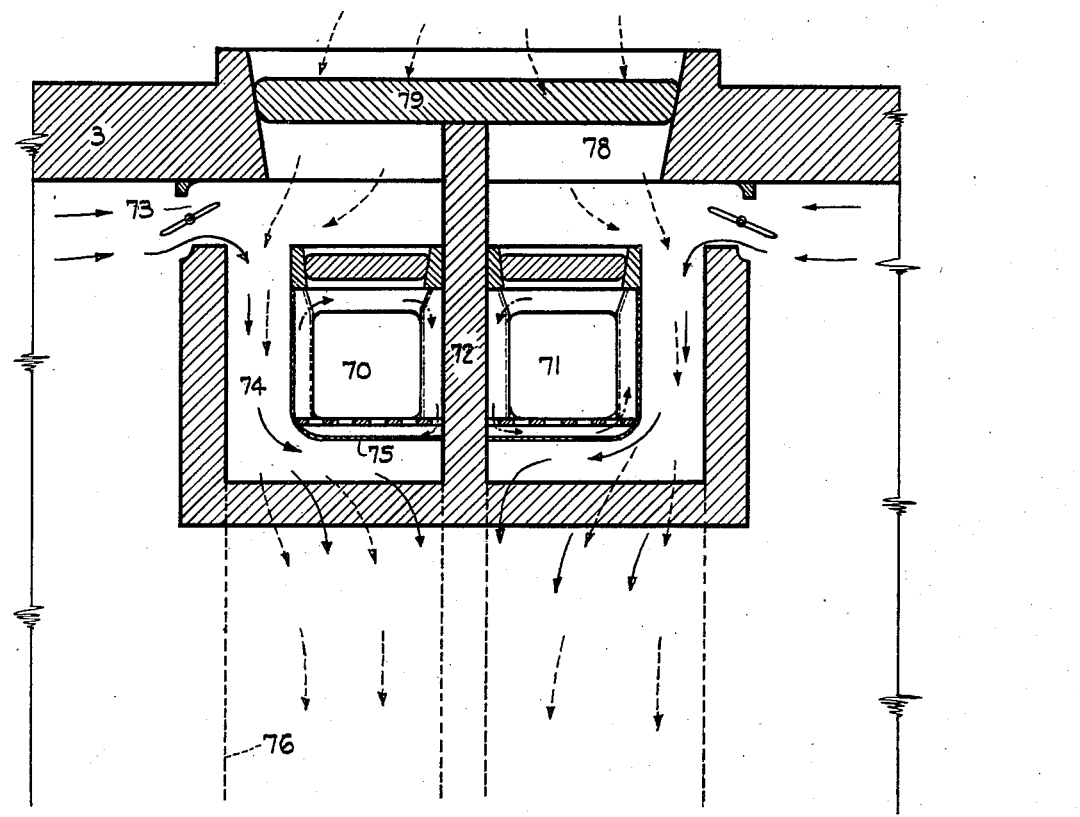
Fig. 5 shows my refrigerating unit adapted to be positioned adjacent the upper part of the side wall of a refrigerating car.

The construction shown in Fig. 5 shows a modification of my invention adapted to be positioned adjacent the middle of the car or adjacent the upper portion of the side wall 4 of the car. The two refrigerant containers 70—71 are insulated from each other (72) and act independently of each other. The convection circulating air passes through the duct 73 and flue 74, and thence below the bottom 75 of the refrigerant container which is also provided with a heat conducting wall and thence down channels 76 which are preferably provided within the side wall 4 of the car and then below the foraminous floor 6. The hatch 78 in the roof preferably extends over both refrigerant chambers 70—71 so they may be loaded simultaneously. The plug 79 seals the hatch.

Figure 6:
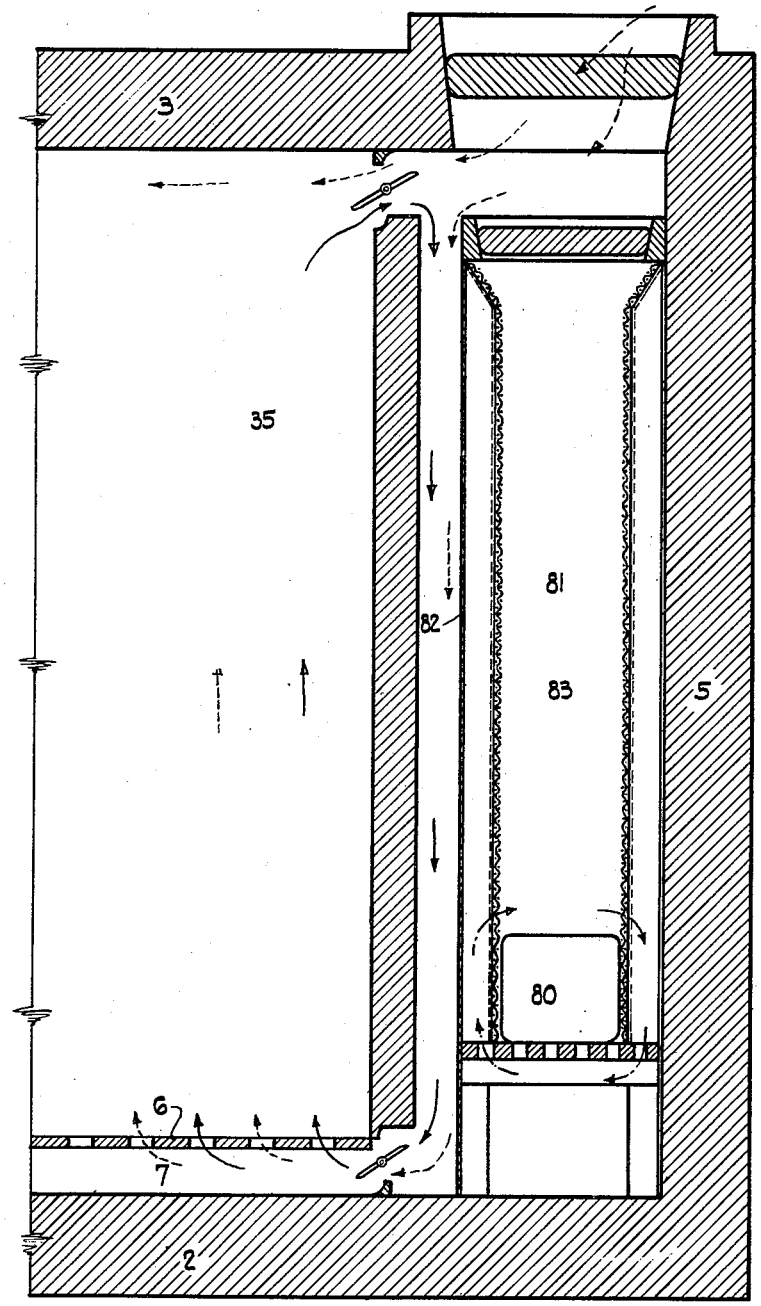
Fig. 6 shows a modification of my invention provided with an expansion chamber.

Fig. 6 shows a relatively small amount of dry ice 80 in the refrigerant container 81 and a refrigerant chamber provided with a relatively large heat conducting surface 82. Carbon dioxide in changing from a solid to a gas at 32 degrees temperature expands about five hundred times in volume capacity and therefore preferably the refrigerant chamber is provided with what may be called and expansion chamber 83, allowing the gas to absorb heat from the air until it reaches a temperature approximately the same as the air; in other words, the gas is not allowed to escape until it has been reduced to the temperature of the interior of the car.

Figure 7:
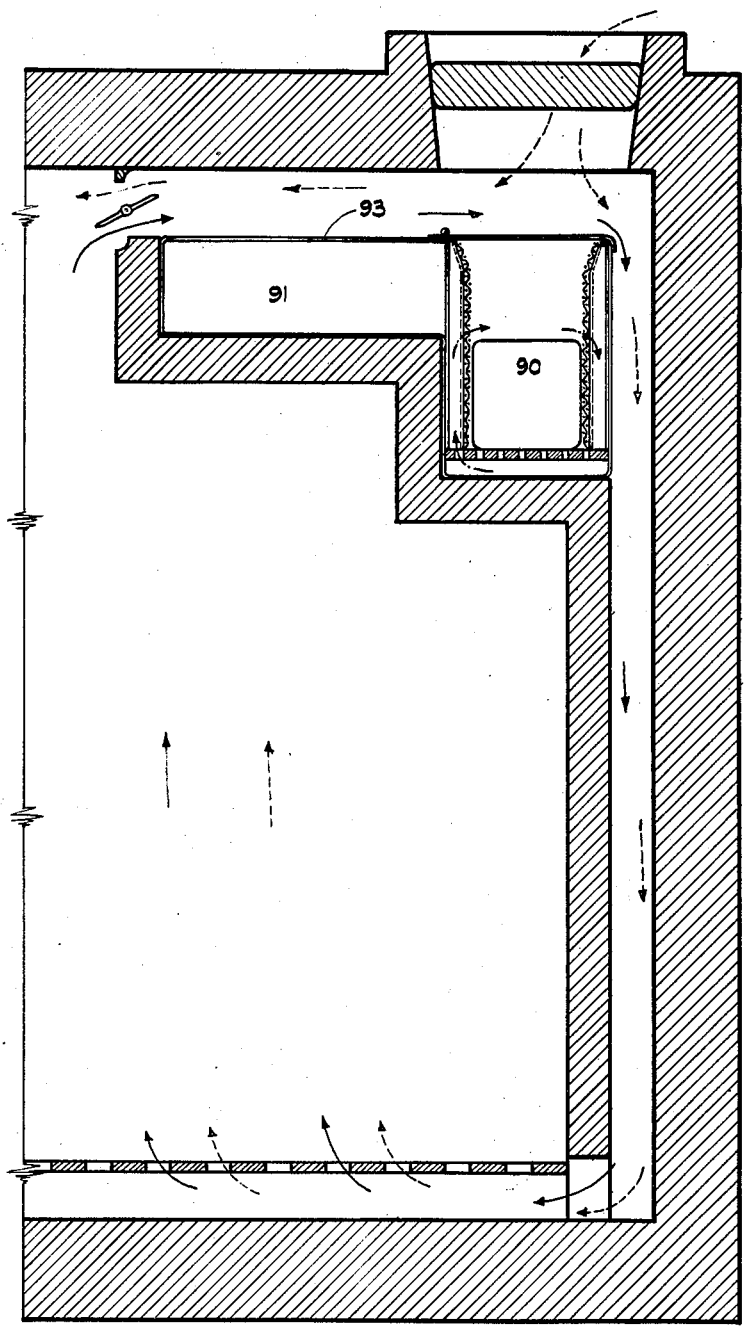
Fig. 7 is a modification of Fig. 6.

Fig. 7 shows a modification similar to Fig. 6 except that the refrigerant container 90 is positioned adjacent one end wall 5 of the car near the roof thereof and the expansion chamber 91 is positioned horizontally adjacent the roof of the car in such location that the air coming from the lading compartment 92 passes over the heat conducting wall 93 forming one of the walls of the expansion chamber.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. A railway refrigerator car comprising a lading compartment, a refrigerator chamber and a bulkhead separating the compartment from the chamber, said bulkhead provided with upper and lower ducts with a solid wall therebetween in combination with a refrigerant container having an insulated vertical wall on one side thereof and a solid heat conducting vertical wall on the opposite side thereof, and means to retain a gas emanating refrigerant in spaced relation to said insulated wall and said heat conducting wall respectively to provide vertical gas flues therebetween whereby gas emanating from the refrigerant within the container being warmed by contact with the heat conducting wall sets up a convection circulation of gas through said gas flues and around the refrigerant and entirely within the container, said heat conducting wall being in spaced relation to a vertical wall of the refrigerating chamber to provide a vertical air flue therebetween, said air flue having communication with both of the ducts of the bulkhead whereby the air within said air flue being cooled by contact with the heat conducting wall sets up a convection circulation of air between the refrigerating chamber and the lading compartment.

2. A railway refrigerator car comprising a lading compartment and a refrigerant container, said container having an insulated vertical wall on one side thereof and a solid heat conducting vertical wall on the opposite side thereof, and means to retain a gas emanating refrigerant in spaced relation to said insulated wall and said heat conducting wall respectively to provide vertical gas flues therebetween whereby gas emanating from the refrigerant within the container being warmed by contact with the heat conducting wall sets up a convection circulation of gas through said gas flues and around the refrigerant and entirely within the container, said heat conducting wall being in heat exchange relationship with the air in said lading compartment.

3. A railway refrigerator car comprising a lading compartment and a refrigerant container, said container having an insulated vertical wall on one side thereof and a solid heat conducting vertical wall on the opposite side thereof, and means to retain a gas emanating refrigerant in spaced relation to said insulated wall and said heat conducting wall respectively to provide vertical gas flues therebetween whereby gas emanating from the refrigerant within the container being warmed by contact with the heat conducting wall sets up a convection circulation of gas through said gas flues and around the refrigerant and entirely within the container, said heat conducting wall being in heat exchange relationship with the air in said lading compartment, and means whereby said air contacting said heat conducting wall causes a convection circulation of air through said lading compartment.

4. In a railway refrigerator car having a roof, a floor and a wall, a lading compartment, a refrigerating chamber and an offset bulkhead separating the compartment from the chamber, said bulkhead provided with upper and lower ducts with a solid wall therebetween, the upper portion and the horizontal portion of the bulkhead forming the wall and floor respectively of the refrigerating chamber and the lower vertical portion of the bulkhead being spaced apart from said car wall to provide a vertical air flue so that the lading compartment extends below the refrigerating chamber, an upper duct in the bulkhead communicating with the refrigerating chamber, a lower duct in the bulkhead communicating with the air flue, a refrigerant container having an insulated vertical wall on one side thereof and a solid heat conducting wall on the opposite side thereof, and means to retain a gas emanating refrigerant in spaced relation to said insulated wall and said heat conducting wall respectively to provide vertical gas flues therebetween whereby gas emanating from the refrigerant within the container being warmed by contact with the heat conducting wall sets up a convection circulation of gas through said gas flues and around the refrigerant and entirely within the container, said heat conducting wall being in spaced relation to a vertical wall of the refrigerating chamber to provide a vertical air flue therebetween which communicates with the before mentioned air flue whereby air within the flue being cooled by contact with the heat conducting wall sets up a convection circulation of air between the refrigerating chamber and the lading compartment.

5. A railway refrigerator car comprising a lading compartment, a refrigerator chamber and a bulkhead separating the compartment from the chamber, said bulkhead provided with upper and lower ducts with a solid wall therebetween in combination with a refrigerant container having an insulated vertical wall on one side thereof and a solid heat conducting vertical wall on the opposite side thereof, and means to retain a gas emanating refrigerant in spaced relation to said insulated wall and said heat conducting wall respectively to provide vertical gas flues therebetween whereby gas emanating from the refrigerant within the container being warmed by contact with the heat conducting wall sets up a convection circulation of gas through said gas flues and around the refrigerant and entirely within the container, said heat conducting wall being in spaced relation to a vertical wall of the refrigerating chamber to provide a vertical air flue therebetween, said air flue having communication with both of the ducts of the bulkhead whereby the air within said air flue being cooled by contact with the heat conducting wall sets up a convection circulation of air between the refrigerating chamber and the lading compartment, a hatch in a wall of the cabinet providing air communication between said air flue and the exterior of the cabinet whereby the cabinet may be ventilated independently of the refrigerant container.

6. A railway refrigerator car comprising a lading compartment, a refrigerating chamber and a bulkhead separating the compartment from the chamber, said bulkhead provided with upper and lower ducts with a solid wall therebetween in combination with a refrigerant container having an insulated vertical wall on one side thereof and a solid heat conducting vertical wall on the opposite side thereof comprising a vertically corrugated metallic plate to provide vertical gas flues, and means to retain a gas emanating refrigerant in spaced relation to said insulated wall to provide vertical gas flues therebetween whereby gas emanating from the refrigerant within the container being warmed by contact with the heat conducting wall sets up a convection circulation of gas through said gas flues and around the refrigerant and entirely within the container, said heat conducting wall being in spaced relation to a vertical wall of the refrigerating chamber to provide a vertical air flue therebetween, said air flue having communication with both of the ducts of the bulkhead whereby the air within said air flue being cooled by contact with the heat conducting wall sets up a convection circulation of air between the refrigerating chamber and the lading compartment.

GARTH G. GILPIN.